United States Patent
Lee et al.

(10) Patent No.: US 8,972,768 B2
(45) Date of Patent: Mar. 3, 2015

(54) APPARATUS AND METHOD FOR SCALING DYNAMIC BUS CLOCK

(75) Inventors: Kang-Min Lee, Suwon-si (KR); Ji-Yong Yoon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1032 days.

(21) Appl. No.: 12/938,561

(22) Filed: Nov. 3, 2010

(65) Prior Publication Data

US 2011/0106992 A1    May 5, 2011

(30) Foreign Application Priority Data

Nov. 5, 2009  (KR) .................. 10-2009-0106325

(51) Int. Cl.
*G06F 1/00* (2006.01)
*G06F 1/32* (2006.01)

(52) U.S. Cl.
CPC .............. *G06F 1/3203* (2013.01); *G06F 1/324* (2013.01); *G06F 1/3253* (2013.01); *Y02B 60/1217* (2013.01); *Y02B 60/1235* (2013.01)
USPC ............................ 713/500; 713/320; 713/322

(58) Field of Classification Search
USPC .................... 713/300, 320, 322, 500; 710/110
See application file for complete search history.

(56) References Cited

U.S. PATENT DOCUMENTS

| | | | |
|---|---|---|---|
| 5,758,133 A | 5/1998 | Evoy | |
| 6,021,506 A * | 2/2000 | Cho et al. ...................... | 713/601 |
| 6,076,171 A | 6/2000 | Kawata | |
| 6,079,022 A * | 6/2000 | Young ........................... | 713/300 |
| 6,115,823 A * | 9/2000 | Velasco et al. ................ | 713/322 |
| 6,263,448 B1 * | 7/2001 | Tsern et al. ................... | 713/501 |
| 6,438,635 B1 * | 8/2002 | Date et al. ..................... | 710/113 |
| 6,460,107 B1 * | 10/2002 | Rao et al. ...................... | 710/305 |
| 6,564,329 B1 | 5/2003 | Cheung et al. | |
| 6,604,151 B1 * | 8/2003 | Date et al. ....................... | 710/14 |
| 6,850,995 B1 * | 2/2005 | Shishizuka et al. ............ | 710/20 |
| 7,093,153 B1 * | 8/2006 | Witek et al. ................... | 713/600 |
| 7,206,869 B2 * | 4/2007 | Shishizuka et al. ............ | 710/20 |
| 7,207,014 B2 * | 4/2007 | Velasco et al. ................ | 716/138 |
| 7,725,759 B2 * | 5/2010 | Henson ......................... | 713/600 |
| 8,032,678 B2 * | 10/2011 | Tardieux et al. .............. | 710/113 |
| 8,405,617 B2 * | 3/2013 | Wilson et al. ................. | 345/173 |
| 2002/0083241 A1 * | 6/2002 | Moller .......................... | 710/100 |

(Continued)

FOREIGN PATENT DOCUMENTS

| | | |
|---|---|---|
| CN | 1338067 A | 2/2002 |
| CN | 101120294 A | 2/2008 |
| CN | 101477398 A | 7/2009 |
| JP | 09-97122 A | 4/1997 |

(Continued)

*Primary Examiner* — Suresh Suryawanshi
(74) *Attorney, Agent, or Firm* — Jefferson IP Law, LLP (57) ABSTRACT

An apparatus and a method for scaling a dynamic bus clock are provided. The apparatus for scaling the dynamic bus clock includes at least one master module, at least one slave module, a bus for delivering data transmitted and received by the at least one master module and the at least one slave module, a bus frequency controller for determining a bus clock frequency by considering activity information of the at least one master module, and a clock generator for generating the frequency as determined by the bus frequency controller and providing the generated frequency to the at least one master module, the at least one slave module, and the bus.

18 Claims, 9 Drawing Sheets

(56) References Cited

U.S. PATENT DOCUMENTS

| | | |
|---|---|---|
| 2004/0141404 A1* | 7/2004 | Tsern et al. .................... 365/233 |
| 2004/0215986 A1 | 10/2004 | Shakkarwar |
| 2005/0132238 A1 | 6/2005 | Nanja |
| 2007/0006006 A1* | 1/2007 | Henson .......................... 713/322 |
| 2007/0067652 A1* | 3/2007 | Asai .............................. 713/300 |
| 2008/0162967 A1 | 7/2008 | Wilson et al. |
| 2008/0263254 A1* | 10/2008 | Su et al. ........................ 710/310 |

FOREIGN PATENT DOCUMENTS

| | | |
|---|---|---|
| JP | 10-268963 A | 10/1998 |
| JP | 2000-276436 A | 10/2000 |
| JP | 2002-082904 A | 3/2002 |
| JP | 2004-258695 A | 9/2004 |
| JP | 2006-072597 A | 3/2006 |
| JP | 2007-257363 A | 10/2007 |

\* cited by examiner

APPARATUS AND METHOD FOR SCALING DYNAMIC BUS CLOCK

PRIORITY

This application claims the benefit under 35 U.S.C. §119 (a) of a Korean patent application filed in the Korean Intellectual Property Office on Nov. 5, 2009, and assigned Serial No. 10-2009-0106325, the entire disclosure of which is hereby incorporated by reference.

BACKGROUND OF THE INVENTION

1. Field of the Invention

The present invention relates to an apparatus and a method for scaling a dynamic bus clock. More particularly, the present invention relates to an apparatus and a method for scaling a bus clock frequency of a digital system by considering use of an on-chip bus.

2. Description of the Related Art

In a synchronous digital system, one or more master modules and one or more slave modules transmit and receive data based on a bus.

Figure 1:
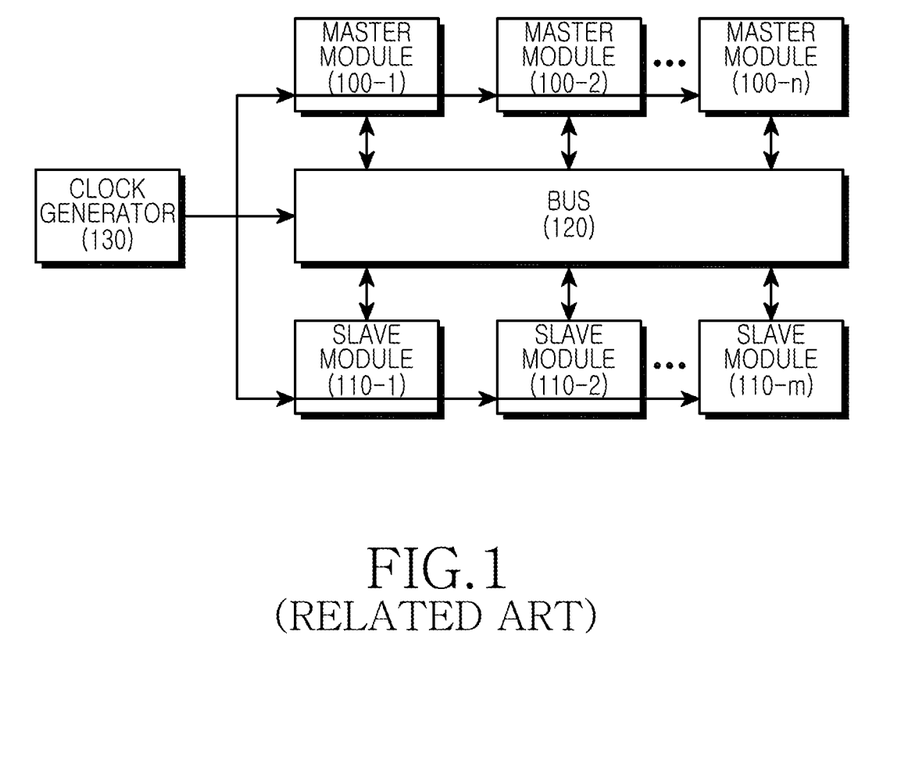
FIG. 1 illustrates a bus of a conventional digital system.

FIG. 1 illustrates a bus in a conventional digital system.

Referring to FIG. 1, one or more master modules 100-1, 100-2, through 100-$n$ transmit and receive data to and from one or more slave modules 110-1, 110-2, through 110-$m$ through a bus 120. The master modules 100-1 through 100-$n$, the slave modules 110-1 through 110-$m$, and the bus 120 use a fixed bus clock BUS_CLK generated by a clock generator 130. The clock generator 130 generates a maximum frequency to achieve the highest performance of the digital system.

To reduce power consumption, the digital system adopts a Dynamic Voltage and Frequency Scaling (DVFS) technique.

Using the DVFS technique, the digital system changes the entire frequency of a Central Processing Unit (CPU) or the digital system by measuring activity information of a main processor CPU.

However, the DVFS technique regulates voltage and frequency of the CPU by measuring only the activity information of the CPU. Accordingly, the digital system merely reduces the power of the CPU by changing the frequency of the CPU using the DVFS technique.

When the entire frequency of the digital system is changed using the DVFS technique and there exists a master module requiring an independent bus bandwidth besides the CPU, the performance of the digital system may be degraded due to the CPU-centered DVFS technique.

SUMMARY OF THE INVENTION

An aspect of the present invention is to address at least the above-mentioned problems and/or disadvantages and to provide at least the advantages described below. Accordingly, an aspect of the present invention is to provide an apparatus and a method for reducing power consumption of a system by changing a bus clock frequency in a digital system.

Another aspect of the present invention is to provide an apparatus and a method for changing a bus clock frequency by considering use of an on-chip bus in a digital system.

Yet another aspect of the present invention is to provide an apparatus and a method for changing a bus clock frequency in stages by considering use of an on-chip bus in a digital system.

Still another aspect of the present invention is to provide an apparatus and a method for changing a bus clock frequency by considering use of an on-chip bus according to a master module in a digital system.

In accordance with an aspect of the present invention, a method for scaling a dynamic bus clock is provided. The method includes determining activity information of at least one master module, determining a sum of the activity information of the at least one master module, and determining a bus clock frequency by considering the activity information of the at least one master module.

In accordance with another aspect of the present invention, a method for scaling a dynamic bus clock is provided. The method includes determining whether there exists a master module which uses a bus, when there is no master module using the bus for a reference time, lowering a bus clock frequency, and when there is at least one master module using the bus within the reference time, increasing the bus clock frequency.

In accordance with yet another aspect of the present invention, an apparatus for scaling a dynamic bus clock is provided. The apparatus includes at least one master module, at least one slave module, a bus for delivering data transmitted and received by the at least one master module and the at least one slave module, a bus frequency controller for determining a bus clock frequency by considering activity information of the at least one master module, and a clock generator for generating the frequency as determined by the bus frequency controller and for providing the generated frequency to the at least one master module, the at least one slave module, and the bus.

In accordance with still another aspect of the present invention, an apparatus for scaling a dynamic bus clock is provided. The apparatus includes at least one master module, at least one slave module, a bus for delivering data transmitted and received by the at least one master module and the at least one slave module, a bus frequency controller for determining a bus clock frequency by determining whether there exits a master module which uses the bus, and a clock generator for generating the frequency as determined by the bus frequency controller and for providing the generated frequency to the at least one master module, the at least one slave module, and the bus.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention provide a technique for changing a bus clock frequency of a digital system by considering use of an on-chip bus.

Figure 2:
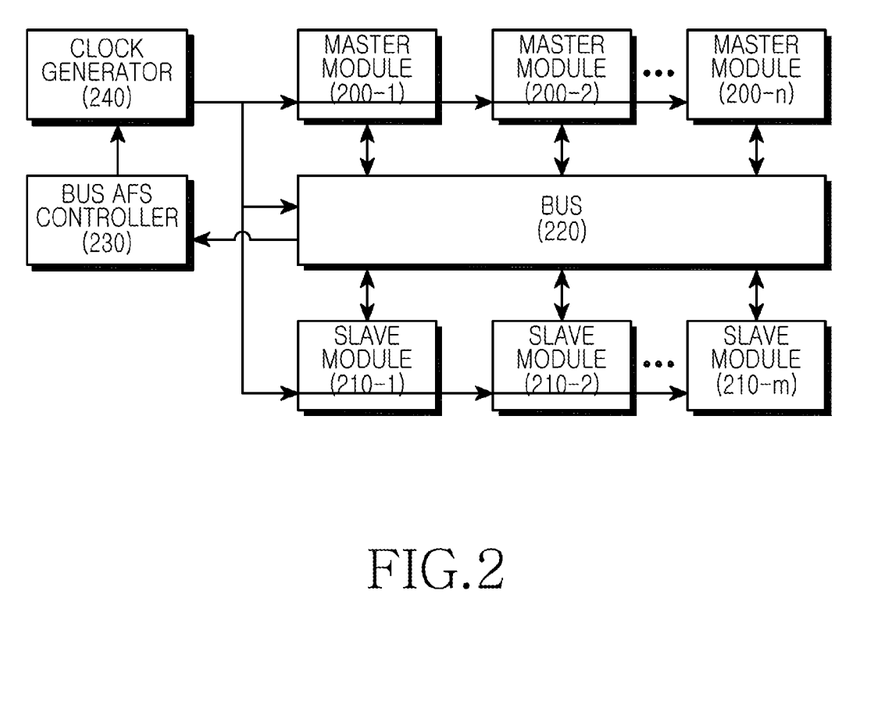
FIG. 2 illustrates a bus of a digital system according to an exemplary embodiment of the present invention.

FIG. 2 illustrates a bus of a digital system according to an exemplary embodiment of the present invention.

Referring to FIG. 2, one or more master modules 200-1, 200-2, through 200-n transmits and receives data to and from one or more slave modules 210-1, 210-2, through 210-m through a bus 220. The master modules 200-1 through 200-n, the bus 220, and the slave modules 210-1 through 210-m, operate by using a bus clock BUS_CLK generated by a clock generator 240.

The clock generator 240 generates the bus clock to operate the master modules 200-1 through 200-n, the slave modules 210-1 through 210-m, and the bus 220 under the control of a bus Adaptive Frequency Scaling (AFS) controller 230.

The bus AFS controller 230 controls the clock generator 240 to generate the bus clock according to whether the master modules 200-1 through 200-n utilize the bus 220. For example, the bus AFS controller 230 may determine whether the corresponding master module 200-1 through 200-n uses a read channel, based on RVALID signals and RREADY signals of the master modules 200-1 through 200-n. Also, the bus AFS controller 230 may determine whether the corresponding master module 200-1 through 200-n uses a write channel, based on WVALID signals and WREADY signals of the master modules 200-1 through 200-n.

Figure 3:
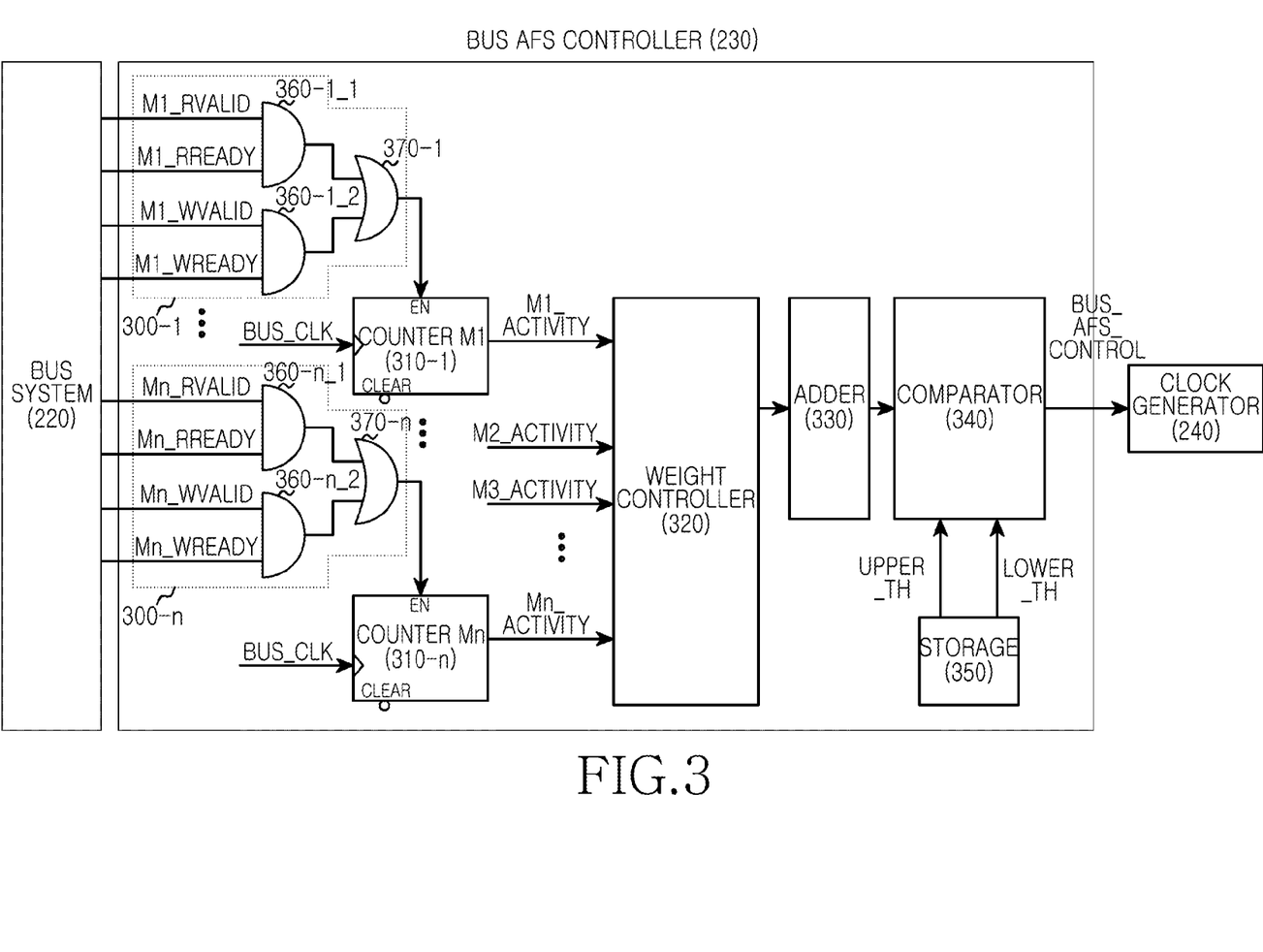
FIG. 3 illustrates a bus Adaptive Frequency Scaling (AFS) controller according to an exemplary embodiment of the present invention.

FIG. 3 illustrates a bus AFS controller according to an exemplary embodiment of the present invention.

Referring to FIG. 3, the bus AFS controller 230 includes channel checkers 300-1 through 300-n, counters 310-1 through 310-n, a weight controller 320, an adder 330, a comparator 340, and a storage 350.

The channel checkers 300-1 through 300-n determine whether the master modules 200-1 through 200-n use the bus. For example, the first channel checker 300-1 determines whether a read channel bus and a write channel bus of the first master module 200-1 are used. For example, the first channel checker 300-1 determines whether the read channel bus is used, based on the RVALID signal and the RREADY signal of the first master module 200-1. The first channel checker 300-1 determines whether the write channel bus is used, based on the WVALID signal and the WREADY signal of the first master module 200-1. In so doing, the first channel checker 300-1 applies an AND operation 360-1_1 to the RVALID signal and the RREADY signal received from the first master module 200-1, and an AND operation 360-1_2 to the WVALID signal and the WREADY signal. Next, by applying an OR operation 370-1 to the AND operation 360-1_1 of the read channel and the AND operation 360-1_2 of the write channel, the first channel checker 300-1 determines whether the first master module 200-1 uses the read channel or the write channel. The first channel checker 300-1 sends the result of the OR operation 370-1 to an 'en' pin of the first counter 310-1. Similarly, the $n^{th}$ channel checker 300-n determines whether the write channel bus is used, based on the WVALID signal and the WREADY signal of the $n^{th}$ master module 200-n. In so doing, the $n^{th}$ channel checker 300-n applies an AND operation 360-n_1 to the RVALID signal and the RREADY signal received from the $n^{th}$ master module 200-n, and an AND operation 360-n_2 to the WVALID signal and the WREADY signal. Next, by applying an OR operation 370-n to the AND operation 360-n_1 of the read channel and the AND operation 360-n_2 of the write channel, the $n^{th}$ channel checker 300-n determines whether the $n^{th}$ master module 200-n uses the read channel or the write channel. The $n^{th}$ channel checker 300-n sends the result of the OR operation 370-n to an 'en' pin of the $n^{th}$ counter 310-n.

The counters 310-1 through 310-n determine activity information of the corresponding master module according to the bus use information of the master modules 200-1 through 200-n provided from the channel checkers 300-1 through 310-n. For example, the counters 310-1 through 310-n count only when the master modules 200-1 through 200-n utilize the bus.

The counters 310-1 through 310-n send the activity information of the master modules 200-1 through 200-n, accumulated for a certain time, to the weight controller 320. For example, the counters 310-1 through 310-n constitute the activity information of the master modules 200-1 through 200-n accumulated for the certain time in a multi-bit form, and send the information to the weight controller 320.

The weight controller 320 applies different weights to the activity information of the master modules 200-1 through 200-n provided from the counters 310-1 through 310-n. For example, when the weight controller 320 includes at least one shifter, the shifter shifts the bus use of the corresponding master module by the weight of the corresponding master module.

The adder 330 determines a sum of the activity information of the master modules 200-1 through 200-n weighted by the weight controller 320.

The comparator 340 determines the bus clock frequency to be generated by the clock generator 240 by comparing the sum of the activity information of the master modules 200-1 through 200-n output from the adder 330 with thresholds for changing the bus clock. For example, the comparator 340 obtains threshold information for changing the bus clock from the storage 350. Next, the comparator 340 compares the sum of the activity information of the master modules 200-1 through 200-n output from the adder 330 with the threshold information. When the sum of the activity information of the master modules 200-1 through 200-n is less than a first threshold, the comparator 340 controls to lower the bus clock frequency generated by the clock generator 240. When the sum of the activity information of the master modules 200-1 through 200-n is greater than a second threshold, the comparator 340 controls to increase the bus clock frequency generated by the clock generator 240. At this time, when the clock generator 240 generates the maximum bus clock, the comparator 340 controls to maintain the bus clock. When the sum of the activity information of the master modules 200-1 through 200-n is greater than the first threshold and less than the second threshold, the comparator 340 controls to maintain the bus clock frequency generated by the clock generator 240. Herein, the first threshold is a threshold for lowering the bus clock frequency, and the second threshold is a threshold for raising the bus clock frequency.

The storage 350 stores the thresholds for altering the bus clock at the comparator 340. The storage 350 also contains the weight information applied to the master modules 200-1 through 200-n at the weight controller 320.

In this exemplary embodiment, the comparator 340 compares the sum of the activity information of the master modules 200-1 through 200-n determined by the adder 330 with the thresholds for changing the bus clock.

Alternatively, the adder 330 sends the sum of the activity information of the master modules 200-1 through 200-n, to a ratio determiner (not shown). The ratio determiner determines activity time ratios of the master modules 200-1 through 200-n by considering the sum of the activity information of the master modules 200-1 through 200-n. By comparing the activity time ratios of the master modules 200-1 through 200-n determined by the ratio determiner with the thresholds, the comparator 340 may determine the bus clock frequency to be generated by the clock generator 240.

As constructed above, the bus AFS controller 230 controls the bus clock frequency.

Figure 4:
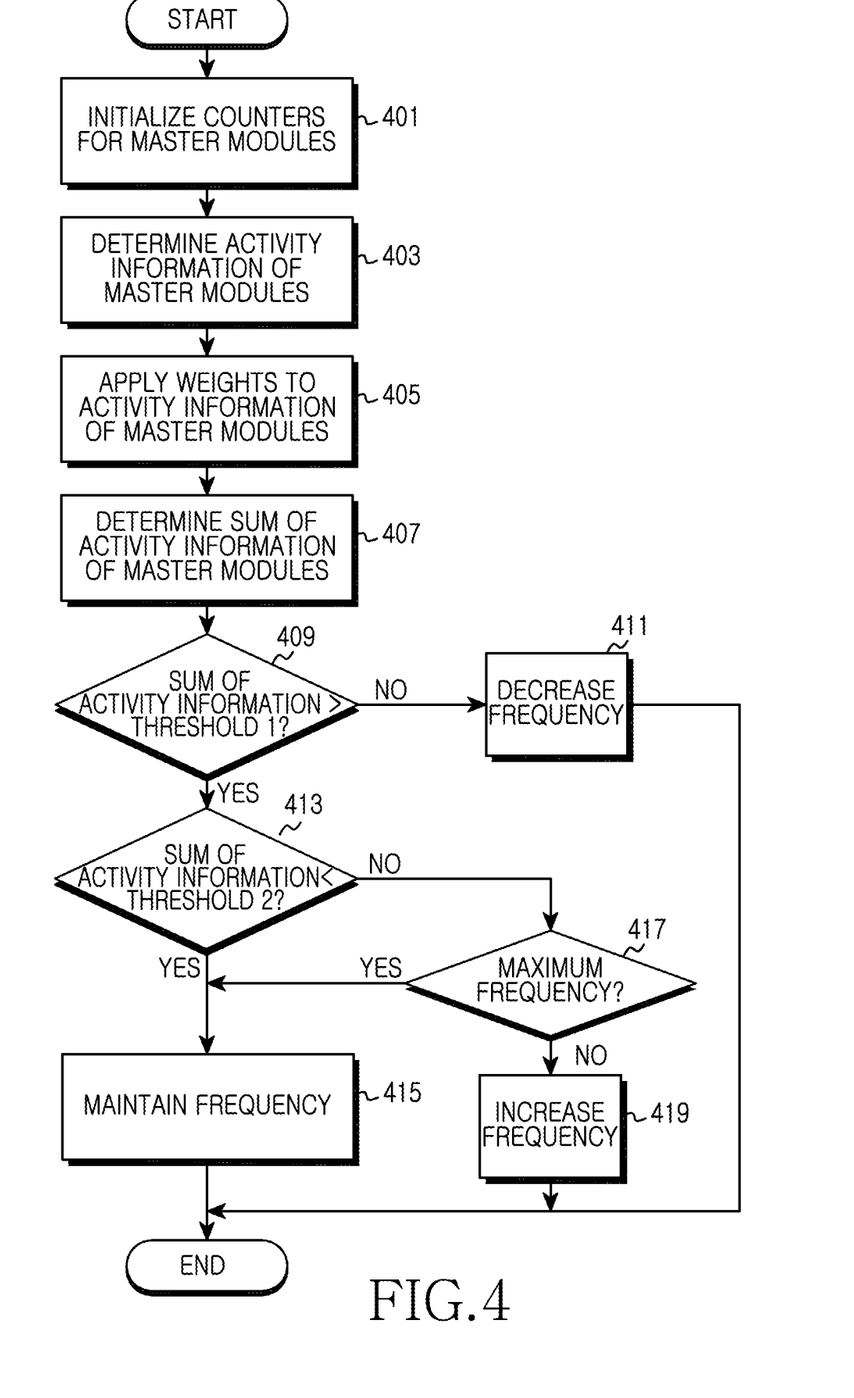
FIG. 4 illustrates a method for scaling a bus clock frequency according to an exemplary embodiment of the present invention.

FIG. 4 illustrates a method for scaling a bus clock frequency according to an exemplary embodiment of the present invention.

The bus AFS controller 230 initializes the counter for each master module in step 401. For example, the bus AFS controller 230 initializes the counters 310-1 through 310-n in FIG. 3.

In step 403, the bus AFS controller 230 determines the activity information of the master modules using the counters for the master modules. For example, the counters 310-1 through 310-n of FIG. 3 count only when the master modules 200-1 through 200-n use the bus.

In step 405, the bus AFS controller 230 applies the weights to the activity information of the master modules. The bus AFS controller 230 applies the different weights to the activity information of the master modules.

In step 407, the bus AFS controller 230 determines the sum of the weighted activity information of the master modules.

In step 409, the bus AFS controller 230 determines whether to lower the bus clock frequency by considering the sum of the activity information of the master modules indicating the bus use of the master modules. For example, the bus AFS controller 230 compares the sum of the activity information of the master modules determined in step 407 with the first threshold. Herein, the first threshold is the lower threshold for decreasing the bus clock frequency.

When it is determined in step 409 that the sum of the activity information of the master modules is less than or equal to the first threshold, the bus AFS controller 230 recognizes the low bus use of the master modules. Thus, the bus AFS controller 230 lowers the bus clock frequency in step 411. For example, the bus AFS controller 230 controls to minimize the bus clock frequency.

In contrast, if it is determined in step 409 that the sum of activity information of the master modules is greater than the first threshold, the bus AFS controller 230 determines whether to increase the bus clock frequency by taking account of the sum of the activity information of the master modules in step 413. For example, the bus AFS controller 230 compares the sum of the activity information of the master modules with the second threshold. Herein, the second threshold is the upper threshold for increasing the bus clock frequency.

When it is determined in step 413 that the sum of the activity information of the master modules is less than the second threshold, the bus AFS controller 230 recognizes that the current bus clock is suitable for the bus use of the master modules. Hence, the bus AFS controller 230 controls to maintain the bus clock frequency in step 415.

Meanwhile, if it is determined in step 413 that the sum of the activity information of the master modules is greater than or equal to the second threshold, the bus AFS controller 230 recognizes the high bus use of the master modules. The bus AFS controller 230 determines whether to raise the bus clock frequency in step 417. That is, the bus AFS controller 230 determines whether the current bus clock frequency is equal to the maximum frequency supportable by the digital system.

When it is determined in step 417 that the bus clock frequency is equal to the maximum frequency supportable by the digital system, the bus AFS controller 230 controls to maintain the bus clock frequency in step 415.

In contrast, if it is determined in step 417 that the bus clock frequency is not equal to the maximum frequency supportable by the digital system, the bus AFS controller 230 increases the bus clock frequency in step 419. For example, the bus AFS controller 230 controls to maximize the bus clock frequency.

Next, the bus AFS controller 230 finishes this process.

In this exemplary embodiment, the bus AFS controller 230 determines the bus use of the master modules by applying the weights to the activity information of the master modules.

Figure 5:
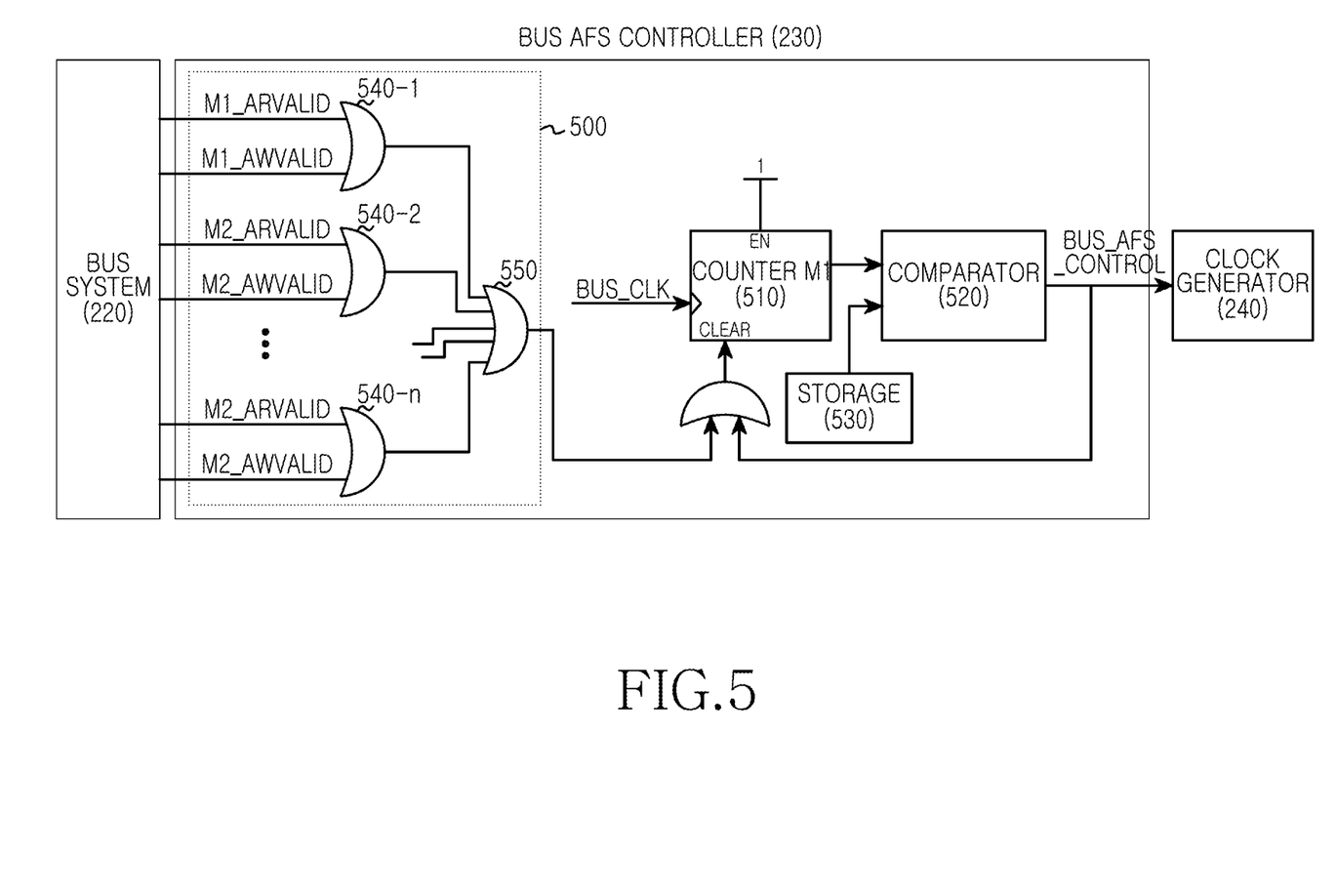
FIG. 5 illustrates a bus AFS controller according to an exemplary embodiment of the present invention.

Alternatively, the bus AFS controller 230 can determine the bus use without distinction of the master modules as shown in FIG. 5.

FIG. 5 depicts a bus AFS controller according to an exemplary embodiment of the present invention.

Referring to FIG. 5, the bus AFS controller 230 includes a channel checker 500, a counter 510, a comparator 520, and a storage 530.

The channel checker 500 determines whether the master modules 200-1 through 200-n use the bus. That is, the channel checker 500 determines whether the master modules 200-1 through 200-n utilize the read channel bus and the write channel bus. For example, the channel checker 500 applies an OR operation 540-1, 540-2, 540-n to ARVALID signals and AWVALID signals provided from the master modules 200-1 through 200-n. Next, the channel checker 500 determines whether the master modules 200-1 through 200-n use the bus by applying an OR operation 550 to results of the OR operations 540-1 through 540-n of the master modules 200-1 through 200-n. Hereinafter, the OR operation 550 applied to the results of the OR operations 540-1 through 540-n of the master modules 200-1 through 200-n, is referred to as AVALID_OR.

When any one of the master modules 200-1 through 200-n requests the bus, the channel checker 500 sends the AVALID_OR set to 'High' to the counter 510. When there are no master modules using the bus, the channel checker 500 sends the AVALID_OR set to 'Low' to the counter 510.

The counter 510 operates according to the AVALID_OR fed from the channel checker 500. For example, when the AVALID_OR is High, the counter 510 is reset and the counter 510 does not send the counting value to the comparator 520. In contrast, when the AVALID_OR is Low, the counter 510 sends the counting value to the comparator 520.

According to the counting value output from the counter 510, the comparator 520 determines the bus clock frequency to be generated by the clock generator 240. For example, the comparator 520 obtains reference time information to lower the bus clock frequency, from the storage 530. Next, when the counter 510 continuously provides the counting value during the reference time, the comparator 520 recognizes that there are no master modules using the bus. Thus, the comparator 520 controls to lower the bus clock frequency. The counter 510 is reset according to the output signal of the comparator 520. For example, when the counter 510 is reset according to the AVALID_OR High, the comparator 520 controls to increase the bus clock frequency.

The storage 530 stores the reference time information for the comparator 520 to change the bus clock.

In the above exemplary embodiment, the bus AFS controller 230 controls to lower the bus clock frequency when there are no master modules using the bus during the reference time.

Alternatively, the bus AFS controller 230 may determine the bus clock frequency by considering a ratio of the counting value of the counter 510 during the reference time.

As constructed above, the bus AFS controller 230 controls the bus clock frequency.

Figure 6:
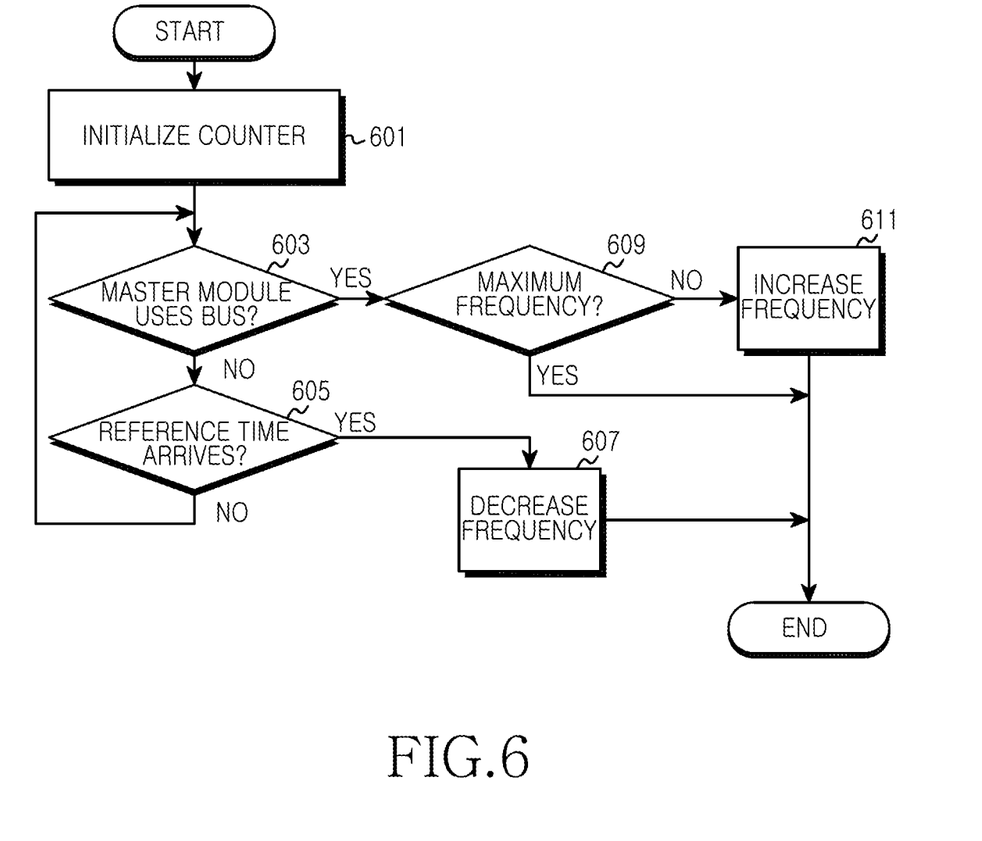
FIG. 6 illustrates a method for scaling the bus clock frequency according to an exemplary embodiment of the present invention.

FIG. 6 illustrates a method for scaling a bus clock frequency according to an exemplary embodiment of the present invention.

The bus AFS controller 230 initializes the counter in step 601. For example, the bus AFS controller 230 initializes the counter 510 of FIG. 5.

In step 603, the bus AFS controller 230 determines whether there exists the master module using the bus. For example, the bus AFS controller 230 determines whether at least one master module issues the ARVALID signal or the AWVALID signal.

When it is determined in step 603 that there is no master module using the bus, the bus AFS controller 230 determines whether the reference time arrives in step 605. In other words, the bus AFS controller 230 determines whether the counter initialized in step 601 continuously operates over the reference time.

When it is determined in step 605 that the reference time does not arrive, the bus AFS controller 230 again determines whether there exists the master module using the bus in step 603.

On the other hand, if it is determined in step 605 that the reference time arrives, the bus AFS controller 230 recognizes the low bus use of the master modules. Hence, the bus AFS controller 230 controls to decrease the bus clock frequency in step 607.

When it is determined in step 603 that there is a master module using the bus, the bus AFS controller 230 recognizes the high bus use of the master modules. Accordingly, the bus AFS controller 230 determines whether to raise the bus clock frequency in step 609. That is, the bus AFS controller 230 determines whether the current bus clock frequency is equal to the maximum frequency supportable by the digital system. When there is a master module using the bus, the bus AFS controller 230 resets the counter initialized in step 601, which is not illustrated in FIG. 6.

When it is determined in step 609 that the bus clock frequency is equal to the maximum frequency supportable by the digital system, the bus AFS controller 230 finishes this process. At this time, the bus AFS controller 230 controls to maintain the bus clock frequency.

On the other hand, when it is determined in step 609 that the bus clock frequency is not equal to the maximum frequency supportable by the digital system, the bus AFS controller 230 controls to increase the bus clock frequency in step 611.

Next, the bus AFS controller 230 finishes this process.

In this exemplary embodiment, the bus AFS controller 230 controls to maximize or minimize the bus clock frequency according to the bus use of the master modules.

Figure 7:
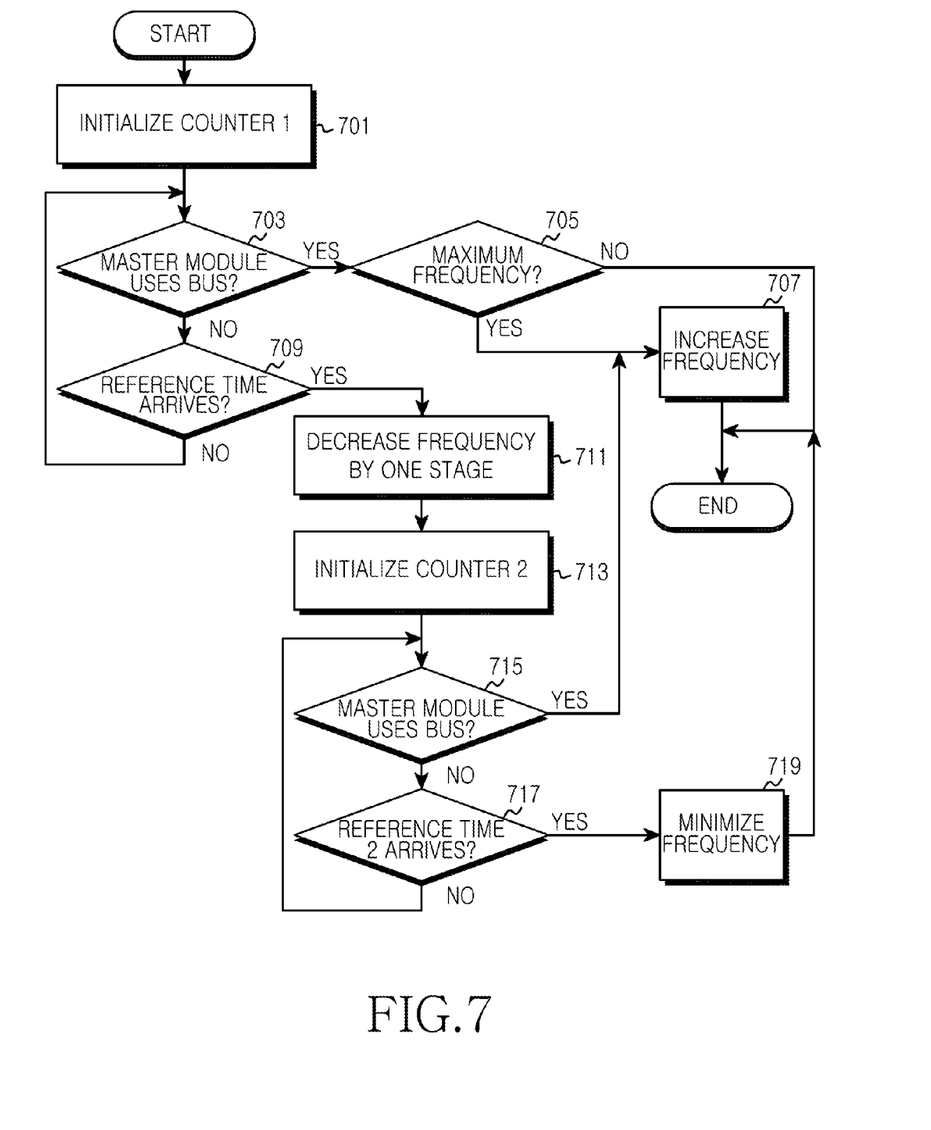
FIG. 7 illustrates a method for scaling the bus clock frequency according to an exemplary embodiment of the present invention.

Alternatively, the bus AFS controller 230 may scale the bus clock frequency by stages according to the bus use of the master modules.

FIG. 7 illustrates a method for scaling a bus clock frequency according to an exemplary embodiment of the present invention.

Referring to FIG. 7, the bus AFS controller 230 initializes the first counter in step 701. For example, the bus AFS controller 230 initializes the counter 510 of FIG. 5.

In step 703, the bus AFS controller 230 determines whether there exists a master module using the bus. For example, the bus AFS controller 230 determines whether at least one master module issues the ARVALID signal or the AWVALID signal.

When it is determined in step 703 that there is the master module using the bus, the bus AFS controller 230 recognizes the high bus use of the master modules. Accordingly, the bus AFS controller 230 determines whether to raise the bus clock frequency in step 705. That is, the bus AFS controller 230 determines whether the current bus clock frequency is equal to the maximum frequency supportable by the digital system. When there is the master module using the bus, the bus AFS controller 230 resets the counter initialized in step 701, which is not illustrated in FIG. 7.

When it is determined in step 705 that the bus clock frequency is equal to the maximum frequency supportable by the digital system, the bus AFS controller 230 finishes this process. At this time, the bus AFS controller 230 controls to maintain the bus clock frequency.

On the other hand, when it is determined in step 705 that the bus clock frequency is not equal to the maximum frequency supportable by the digital system, the bus AFS controller 230 controls to maximize the bus clock frequency in step 707.

When it is determined in step 703 that there is no master module using the bus, the bus AFS controller 230 determines whether the reference time arrives in step 709. In other words, the bus AFS controller 230 determines whether the counter initialized in step 701 continuously operates over the reference time.

When it is determined in step 709 that the reference time does not arrive, the bus AFS controller 230 determines again whether there exists the master module using the bus in step 703.

When it is determined in step 709 that the reference time arrives, the bus AFS controller 230 recognizes the low bus use of the master modules. Hence, the bus AFS controller 230 controls to decrease the bus clock frequency by one stage in step 711.

In step 713, the bus AFS controller 230 initializes the second counter. Herein, the second counter is used to measure a second reference time for decreasing the bus clock frequency by one more stage.

In step 715, the bus AFS controller 230 determines whether there exists the master module using the bus. For example, the bus AFS controller 230 examines whether at least one master module issues the ARVALID signal or the AWVALID signal.

When it is determined in step 715 that there exists the master module using the bus, the bus AFS controller 230 controls to maximize the bus clock frequency in step 707.

On the other hand, when it is determined in step 715 that there are no master modules using the bus, the bus AFS controller 230 determines whether the second reference time arrives in step 717. In other words, the bus AFS controller 230 determines whether the second counter initialized in step 713 continuously operates over the second reference time.

When it is determined in step 717 that the second reference time does not arrive, the bus AFS controller 230 determines again whether there exists the master module using the bus in step 715.

On the other hand, when it is determined in step 717 that the second reference time arrives, the bus AFS controller 230 recognizes the low bus use of the master modules. Hence, the bus AFS controller 230 controls to minimize the bus clock frequency in step 719.

Next, the bus AFS controller 230 finishes this process.

In an exemplary implementation, when the bus clock frequency is lowered by stages as stated above, the bus AFS controller 230 can scale the bus clock frequency.

Figure 8:
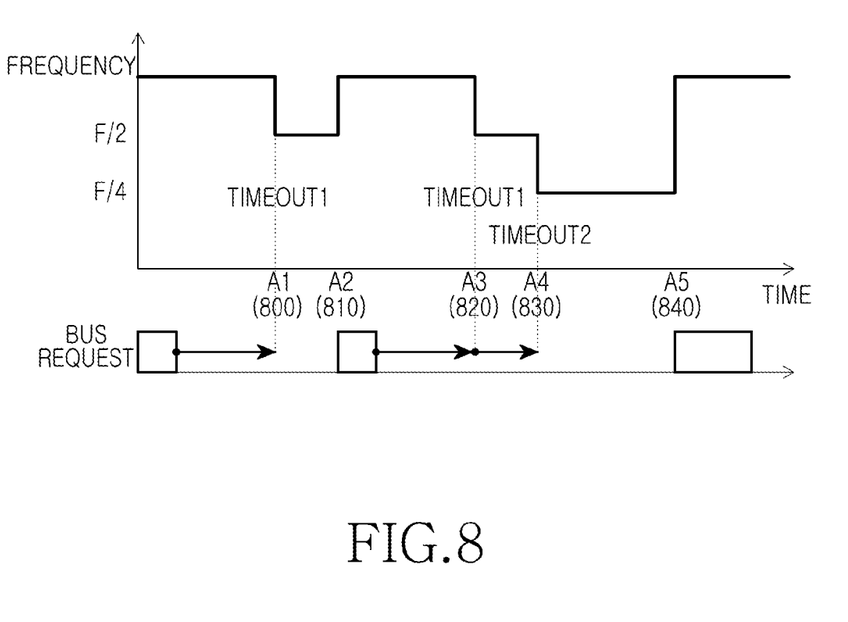
FIG. 8 illustrates frequency changes of a digital system according to an exemplary embodiment of the present invention.

FIG. 8 illustrates frequency changes of a digital system according to an exemplary embodiment of the present invention.

Referring to FIG. 8, when there are no master modules using the bus during the first reference time Timeout1, the bus AFS controller 230 decreases the bus clock frequency by one stage at a time A1 800.

When a master module using the bus emerges at a time A2 810, the bus AFS controller 230 maximizes the bus clock frequency.

When there is no master module using the bus during the first reference time after the time A2 810, the bus AFS controller 230 lowers the bus clock frequency by one stage at a time A3 820. Herein, the first reference time is the same as the time interval from the time A2 810 to the time A3 820.

Next, when there is no master module using the bus from the time A3 820 to a time A4 830, the bus AFS controller 230 minimizes the bus clock frequency at the time A4 830.

When a master module using the bus emerges at a time A5 840, the bus AFS controller 230 maximizes the bus clock frequency.

In this exemplary embodiment, the bus AFS controller 230 decreases the bus clock frequency by two stages using the two counters.

Alternatively, with a single counter, when the counter operates without resetting during the reference time, the bus AFS controller 230 may lower the bus clock frequency by stages.

The bus AFS controller 230 of FIG. 6 and FIG. 7 lowers the bus clock frequency when there are no master modules using the bus during the reference time.

Figure 9:
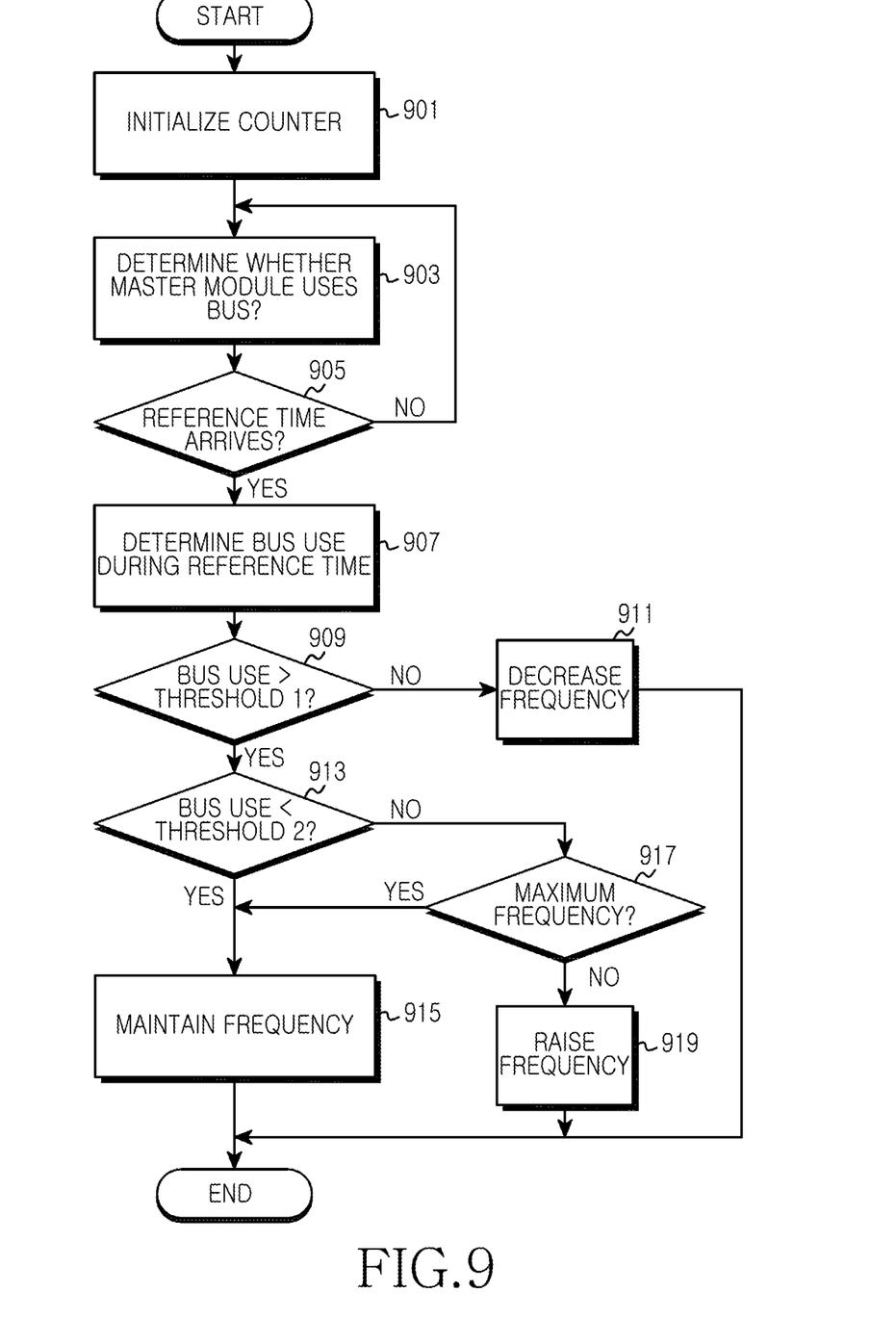
FIG. 9 illustrates a method for scaling the bus clock frequency according to an exemplary embodiment of the present invention.

Alternatively, the bus AFS controller 230 may lower the bus clock frequency according to the bus use of the master modules during the reference time.

FIG. 9 illustrates a method for scaling a bus clock frequency according to an exemplary embodiment of the present invention.

Referring to FIG. 9, the bus AFS controller 230 initializes the counter in step 901. For example, the bus AFS controller 230 initializes the counter 510 of FIG. 5.

In step 903, the bus AFS controller 230 determines whether a master module utilizes the bus. For example, when a master module issues the ARVALID signal or the AWVALID signal, the bus AFS controller 230 recognizes that a master module is using the bus.

In step 905, the bus AFS controller 230 determines whether the reference time arrives.

When it is determined in step 905 that the reference time does not arrive, the bus AFS controller 230 determines whether a master module utilizes the bus in step 903.

In contrast, when it is determined in step 905 that the reference time arrives, the bus AFS controller 230 determines the bus use of the master modules during the reference time in step 907. For example, the counter initialized in step 901 increases the count only when a master module does not use the bus. Accordingly, the bus AFS controller 230 determines the bus use of the master modules during the reference time by taking account of the counting value of the counter for the reference time.

By considering the bus use of the master modules determined in step 907, the bus AFS controller 230 determines whether to lower the bus clock frequency in step 909. For instance, the bus AFS controller 230 compares the bus use determined in step 907 with the first threshold. Herein, the first threshold is the lower threshold for lowering the bus clock frequency.

When it is determined in step 909 that the bus use of the master modules is less than or equal to the first threshold, the bus AFS controller 230 recognizes the low bus use of the master modules. Hence, the bus AFS controller 230 scales down the bus clock frequency in step 911. For example, the bus AFS controller 230 controls to minimize the bus clock frequency. For example, the bus AFS controller 230 controls to decrease the bus clock frequency by one stage according to preset bus clock change frequency stages.

In contrast, when it is determined in step 909 that the bus use of the master modules is greater than the first threshold, the bus AFS controller 230 determines whether to increase the bus clock frequency by considering the determined bus use of the master modules in step 913. For example, the bus AFS controller 230 compares the bus use of the master modules with the second threshold. Herein, the second threshold is the upper threshold for raising the bus clock frequency.

When it is determined in step 913 that the bus use of the master modules is less than the second threshold, the bus AFS controller 230 recognizes that the current bus clock is appropriate for the bus use of the master modules. Hence, the bus AFS controller 230 controls to maintain the bus clock frequency in step 915.

On the other hand, when it is determined in step 913 that the bus use of the master modules is greater than or equal to the second threshold, the bus AFS controller 230 recognizes the high bus use of the master modules. In step 917, the bus AFS controller 230 determines whether to increase the bus clock frequency. That is, the bus AFS controller 230 determines whether the current bus clock frequency is equal to the maximum frequency supportable by the digital system.

When it is determined in step 917 that the bus clock frequency is equal to the maximum frequency supportable by the digital system, the bus AFS controller 230 controls to maintain the bus clock frequency in step 915.

In contrast, when it is determined in step 917 that the bus clock frequency is not equal to the maximum frequency supportable by the digital system, the bus AFS controller 230 increases the bus clock frequency in step 919. For example, the bus AFS controller 230 controls to maximize the bus clock frequency.

Next, the bus AFS controller 230 finishes this process.

As set forth above, by scaling the bus clock frequency of the digital system based on the use of the on-chip bus, the power consumption of the modules using the bus clock can be reduced.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for scaling a dynamic bus clock, the method comprising:
   determining activity information of master modules, wherein the activity information indicates a using rate of channel buses by each of the master modules;
   applying weights to the activity information for each of the master modules;
   determining a sum of the weighted activity information of the master modules; and
   determining a bus clock frequency by considering the sum of the weighted activity information.

2. The method of claim 1, wherein the determining of the activity information comprises determining whether the master module issues a signal to use at least one of a read channel bus and a write channel bus.

3. The method of claim 1, wherein the determining of the bus clock frequency comprises:
   when the sum of the weighted activity information of the master modules is less than a lower threshold, decreasing the bus clock frequency;
   when the sum of the weighted activity information of the master modules is greater than an upper threshold, increasing the bus clock frequency; and
   when the sum of the weighted activity information of the master modules is greater than the lower threshold and less than the upper threshold, not changing the bus clock frequency.

4. A method for scaling a dynamic bus clock, the method comprising:
   determining whether there exists a master module which uses a bus;
   when there is no master module using the bus for a reference time, lowering a bus clock frequency on only that basis; and
   when there is at least one master module using the bus within the reference time, increasing the bus clock frequency to a maximum frequency supportable by the system.

5. The method of claim 4, wherein the determining of the activity information comprises determining whether the master module issues a signal to use at least one of a read channel bus and a write channel bus.

6. The method of claim 4, wherein the lowering of the bus clock frequency comprises, when there is no master module using the bus for the reference time, scaling the bus clock frequency to a minimum frequency supportable by a system.

7. The method of claim 4, wherein the lowering of the bus clock frequency comprises, when there is no master module using the bus for the reference time, decreasing the bus clock frequency by one stage according to at least one bus clock frequency control stage.

8. The method of claim 7, further comprising, after decreasing the bus clock frequency by one stage, when there is no master module using the bus for a second reference time, scaling the bus clock frequency to a minimum frequency supportable by a system.

9. An apparatus for scaling a dynamic bus clock, the apparatus comprising:
   master modules;
   at least one slave module;
   a bus configured to deliver data transmitted and received by the master modules and the at least one slave module;
   a bus frequency controller configured to apply at least one weight to activity information for each of the master modules, to determine a sum of the weighted activity information, and to determine a bus clock frequency based on the sum of the weighted activity information; and
   a clock generator configured to generate the frequency as determined by the bus frequency controller and to provide the generated frequency to the master modules, the at least one slave module, and the bus,
   wherein the activity information indicates a using rate of channel buses by each of the master modules.

10. The apparatus of claim 9, wherein the bus frequency controller comprises:
    at least one channel checker configured to determine the activity information of the master modules;
    an adder configured to determine the sum of weighted the activity information of the master modules; and
    a comparator configured to determine the bus clock frequency by comparing the sum of the weighted activity information of the master modules with at least one threshold.

11. The apparatus of claim 10, wherein the channel checker determines whether the master module issues a signal to use at least one of a read channel bus and a write channel bus.

12. The apparatus of claim 10, wherein the comparator lowers the bus clock frequency when the sum of the weighted activity information of the master modules is less than a lower threshold, increases the bus clock frequency when the sum of the weighted activity information of the master modules is greater than an upper threshold, and does not change the bus clock frequency when the sum of the weighted activity information of the master modules is greater than the lower threshold and less than the upper threshold.

13. An apparatus for scaling a dynamic bus clock, the apparatus comprising:
    at least one master module;
    at least one slave module;
    a bus configured to deliver data transmitted and received by the at least one master module and the at least one slave module;

a bus frequency controller configured to determine a bus clock frequency solely by determining whether there exists a master module which uses the bus;

a clock generator configured to generate the frequency as determined by the bus frequency controller and to provide the generated frequency to the at least one master module, the at least one slave module, and the bus; and a comparator configured to increase the bus clock frequency to a maximum frequency supportable by the system when there is at least one master module using the bus within a reference time.

14. The apparatus of claim 13, wherein the bus frequency controller comprises:

a channel checker configured to determine whether there exists a master module which uses the bus, wherein the comparator is further configured to lower a bus clock frequency when there is no master module using the bus for the reference time.

15. The apparatus of claim 14, wherein the channel checker determines whether the master module issues a signal to use at least one of a read channel bus and a write channel bus.

16. The apparatus of claim 14, wherein, when there is no master module using the bus for the reference time, the comparator scales the bus clock frequency to a minimum frequency supportable by a system.

17. The apparatus of claim 14, wherein, when there is no master module using the bus for the reference time, the comparator decreases the bus clock frequency by one stage according to at least one bus clock frequency control stage.

18. The apparatus of claim 17, wherein, after decreasing the bus clock frequency by one stage, when there is no master module using the bus for a second reference time, the comparator scales the bus clock frequency to a minimum frequency supportable by a system.

* * * * *